United States Patent [19] [11] 3,982,447
Rabenhorst [45] Sept. 28, 1976

[54] CONVOLUTED ROTOR STRUCTURES
[75] Inventor: David W. Rabenhorst, Clarksville, Md.
[73] Assignee: The Johns Hopkins University, Baltimore, Md.
[22] Filed: Sept. 2, 1975
[21] Appl. No.: 609,362

[52] U.S. Cl. ................................ 74/572; 233/1 R
[51] Int. Cl.² ........................................ F16C 15/00
[58] Field of Search ..................................... 74/572

[56] References Cited
UNITED STATES PATENTS
3,296,886   1/1967   Reinhart, Jr. ........................ 74/572
3,602,067   8/1971   Wetherbee, Jr. ..................... 74/572

Primary Examiner—Samuel Scott
Assistant Examiner—F. D. Shoemaker
Attorney, Agent, or Firm—Robert E. Archibald; Kenneth E. Darnell

[57] ABSTRACT

A rotary energy storage device formed of discrete annular rings of anisotropic filamentary material disposed within the rings in a "wound" configuration, the upper and lower edges of each ring being attached alternately to the edges on adjacent rings in a radial orientation to form a structure having a bellows-like or convoluted cross-section. The present structure, due to the convoluted nature of the joined rings, is subject to unusually low radial stress within the material when rotating.

10 Claims, 6 Drawing Figures

CONVOLUTED ROTOR STRUCTURES

STATEMENT OF GOVERNMENTAL INTEREST

The invention herein described was made in the course of or under a contract or subcontract thereunder, with the Department of the Navy. The Government has rights in the invention pursuant to Grant No. AER 75-20607 awarded by the National Science Foundation.

BACKGROUND OF THE INVENTION

During the past several years a new flywheel technology has evolved, which has resulted in a several-fold improvement in the performance of the flywheel structure, while at the same time offering major advances in safety and economy of the device. These improvements are for the most part brought about by the employment of anisotropic, filamentary materials such as carbon or fiberglass fibers or a new DuPont fiber known as Kevlar, all having strength-to-density properties significantly greater than the best practical steel. In addition, the filamentary composition of such materials is of significant importance in flywheel application, since it is this property which enables the flywheel to be more readily designed for failure containment than solid steel flywheel structures previously proposed.

More particularly, it has previously been proposed that improved flywheels can be constructed in the form of wound disc structures with either fiberglass or steel foil as the principal structural material, and such structures are described in detail in a Russian book entitled, "Inertial Energy Accumulators", by N. V. Gulia, Voronezh University Press, Voronezh, 1973. Unfortunately, such structures have had only limited success, because of the hub or hub/spoke attachment difficulty usually found with this type of structure. In an effort to overcome the hub or hub/spoke attachment problem associated with wound disc flywheel structures, I previously proposed a circular brush flywheel configuration which utilizes radially oriented fibers or rods, such as are disclosed in my U.S. Pat. Nos. 3,698,262 and 3,737,694. On the other hand, for certain flywheel applications, it would be advantageous to have an alternative flywheel configuration which appears capable of storing more energy per unit volume than the circular brush configuration, and at a reduced rotational speed or rpm for a given energy level.

The principal reason that previous attempts to build filament-wound flywheels have met with only limited success is the fact that the stress on the wound filaments varies as the square of the distance of the filaments from the center of rotation. Since the amount that the filament stretches is proportional to the stress, the filament thus also stretches in proportion to the square of its radius of rotation; i.e., in a wound rotor having an inside radius of one-third its outside radius, the outside filaments would stretch nine times as much as the filaments on the inside. In this situation, as has been demonstrated many times in past experiments, the flywheel breaks into many concentric rings long before the filaments have reached their breaking stress. This, of course, is true if there are no extra radial filaments in the flywheel structure to take the radial loads. On the other hand, is such extra filaments are added, then the weight of these filaments must be added when determining the energy density of the structure. This simple paradox accounts for the lack of success of filament-wound and multi-rim flywheels previously attempted; performance typically being about 20–30% of theoretical.

One previously proposed manner of accommodating the differential stretching of the filamentary materials is to provide an elastomer matrix which acts as a spacer between the rings or filaments of a multi-ring flywheel allowing the rings to expand while maintaining structural integrity. However, a problem with this arrangement is designing the flywheel so that the elastomer can withstand the high acceleration forces occurring during flywheel operation, and at the same time provide the required stretch capabilities in some direction while also providing the required stiffness in other directions. Moreover, the elastomer matrix will occupy as much as 30% of the space occupied by the working filaments, thereby degrading the volume, weight, and intrinsic cost of this type by about ⅓ compared to the theoretical optimum multi-ring flywheel configuration.

SUMMARY OF THE INVENTION

The invention embodies the concept of an infinitely thin ring or shell having an infinitely long axial taper from maximum diameter to minimum diameter. The material in such a ring will be subject to infinitely low radial stresses, i.e., stresses transverse to the filaments. Utilizing this concept, a practical flywheel can be embodied which can be formed of any desired number of filament-wound rings or rims without the need for elastomer spacers between the rings or radial spokes holding the rings together as has been proposed previously. In particular, the present rotor embodiments provide stiffness to torsional and axial loading while effectively eliminating hub attachment problems.

The type of high strength-to-density materials most suitable for high performance flywheels typically do not have a strength normal to the filaments much greater than 3% of the strength parallel to the filaments. But, if a flywheel ring made of such material were to be made sufficiently thin, then the transverse stress could be held to acceptable limits for the material. However, a flywheel made of a very thin ring would have to be excessively long to be able to have enough mass to store practical amounts of energy.

The present invention involves a structure wherein a very thin ring flywheel can be axially folded upon itself, while still maintaining thin ring advantage of minimal differential radial stress on the ring material. By thus folding the thin ring, a contiguous nearly solid structure having a large number of thin rings is achieved without the need for spokes or elastomer material.

In view of the foregoing, one object of the present invention is to provide an improved multi-ring flywheel structure wherein the alternate edges of adjacent rings are bonded together.

A further object of the present invention is to provide a rotary energy storage device or flywheel which utilizes anisotropic filamentary materials and which possesses substantial energy per unit volume and per unit weight.

A further object of the present invention is to provide an improved structure for interconnecting the ring and hub/spoke portions of a flywheel structure, whereby the ring is permitted some degree of freedom when changing state between standstill and high speed rotation.

A further object of the present invention is to provide a rotary energy storage device or flywheel having increased energy per unit volume and weight, at reduced cost and increased safety.

Other objects, purposes and characteristic features of the present invention will be pointed out in the following description of the preferred embodiments.

DESCRIPTION OF THE PREFERRED EMBODIMENTS

It is proposed in accordance with the present invention to provide an improved flywheel structure wherein the rim portion is comprised of multiple rings or filament windings of high tensile strength, anisotropic materials, such as carbon or fiberglass fibers, having strength to density ratios many times greater than the best practical steels previously proposed for use in flywheel applications. As noted earlier, a further fiber material from which the multiple rings or filamentary windings can be formed for the rim portion of the proposed flywheel of the present invention is a new fiber marketed by DuPont under the trade name Kevlar which has a tensile strength, for the unidirectional composite, of about 250,000 psi and a density of .05 lb per cubic inch; the tensile strength of the bare elements having been measured at over 500,000 psi. This fiber is currently being used as a structural material in a wide variety of components in most of the major aircraft manufactured in the United States today. It does not suffer appreciably from the static fatigue problems usually associated with fiberglass; it is often used at a very high percentage of its tensile strength; and, its strength-to-density and modulus of elasticity are both considerably higher than glass.

Figure 1A:
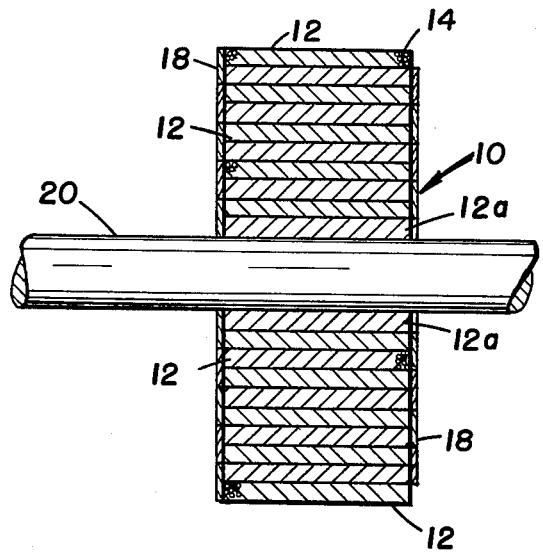
FIG. 1a is an elevation in section of a rotor configured according to the invention and lying at rest.
Figure 1B:
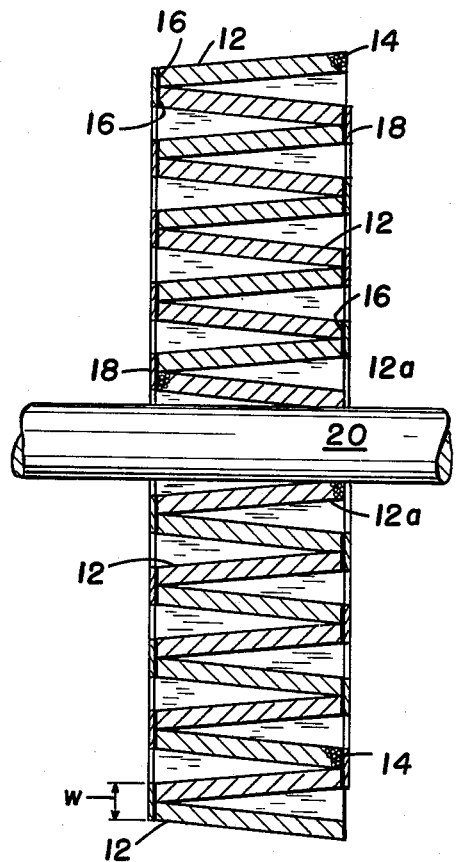
FIG. 1b is an elevation in section of the rotor of FIG. 1a while spinning, the separation between rings being exaggerated for purposes of illustration.
Figure 2:
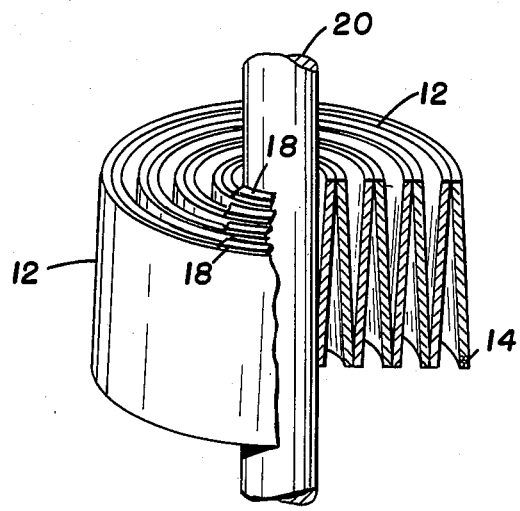
FIG. 2 is a perspective in partial section of the spinning rotor of FIG. 1b.

Referring now to FIGS. 1a, 1b, and 2 of the drawings, the present flywheel concept basically is seen to comprise a rotor structure having a rim member 10 formed of rings 12, the rings 12 being themselves formed of windings 14 of an anisotropic filamentary material. The windings 14 are wound in a variety of ways, including simple circular windings, "herring bone" criss-cross winding, etc. Alternatively, the "windings" 14 may be discrete circular rings, a multiplicity of which would be bonded together to form one of the rings 12. The rings 12 are joined together at alternate peripheral edges 16 thereof. Any given ring 12 (except the innermost and outermost rings) is joined along one peripheral edge 16 to the oppositely facing edge 16 of the adjacent ring 12 located on a first side of the given ring 12, the opposite peripheral edge 16 of the given ring 12 being joined along the oppositely facing edge 16 of the adjacent ring 12 located on the second side of the given ring 12. In effect, the structure thus formed is convoluted in the manner of a flat sheet folded on itself to form a "fan". Stated another way, alternate opposite edges 16 of the rings 12 are joined together about the full peripheries thereof.

The rings 12 may be joined in any number of ways. For example, an adhesive material may be used to bond the edges 16 together. The rings 12 can alternatively be formed of a single winding (or effectively of a single winding) to cause the rings 12 to be unitary in structure. As seen particularly in FIGS. 1a, 1b, and 2, annular members 18 are bonded to both of the joined adjacent edges 16 to hold said adjacent edges 16 together. The members 18 can be formed of wound anisotropic filamentary material.

The innermost rings 12a is mounted to a shaft 20 about the inner periphery of the ring. When the shaft 20 is not rotating, the rings 12 "lie down" inwardly against each other to form a essentially solid structure, seen in FIG. 1a, which is relatively more compact than is the rim member 10 when the shaft 20 is rotating. The separation of the rings 12 is not as pronounced as is shown in FIGS. 1b and 2, however, the spacings between rings being exaggerated for illustration of the fact that the rings do indeed separate when spinning. This separation of the rings on rotation of the structure would typically not cause the structure to expand to a diameter which would be as much as 2% greater than the diameter at rest. The width, $w$, of the juncture of any two edges 16 should not exceed 15% of the outer diameter of the rim member 10 in order to prevent excessive radial separatory loading on the structure at that point.

Figure 3A:
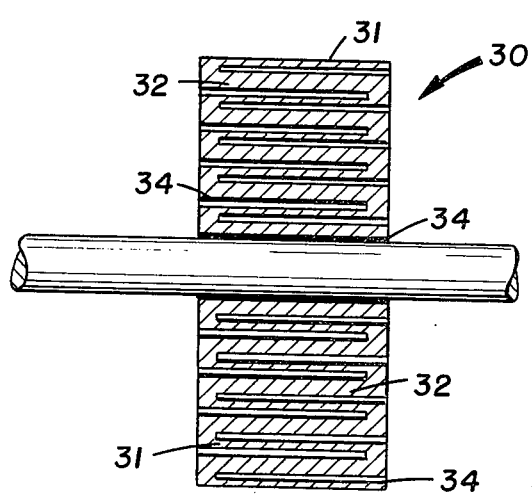
FIG. 3a is an elevation in section of a non-spinning rotor having alternating rings of varying thickness, and which are ballasted.
Figure 3B:
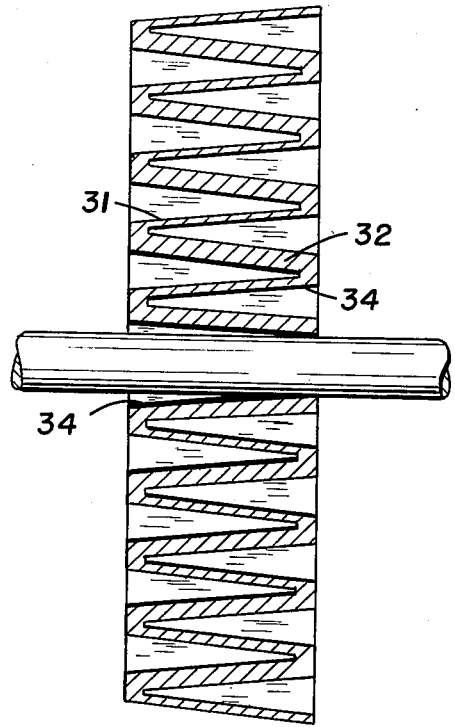
FIG. 3b is an elevation in section of the rotor of FIG. 3a while spinning.

FIGS. 3a and 3b are analogous to FIGS. 1a and 1b except that alternate rings 31 and 32 thereof vary in width and the structure is ballasted with ballast material 34 to improve volumetric efficiency. The rim member 30 of FIGS. 3a and 3b functions in the same fashion as does the rim member 10 of FIGS. 1a and 1b, the rings of filamentary material "expanding" on rotation of the structure. The ballast material 34 is not required for successful operation of the structure, merely for possible cost reduction and reduction of rotor volume. The amount of ballast between the rings 32 and 31 is chosen to vary inversely with the square of the radius of the location of the ballast within the rim member 30. Examples of typical ballast material 34 include solid lead, uranium or steel dust in a lead or other relatively flexible matrix.

The penalty for adding ballast to obtain an energy per unit volume advantage is a slightly reduced energy per unit weight. The degradation would ideally be zero, if the ballast did not take up any space, since the total energy will be proportional to the weight, when the other governing factors (radius and rpm) do not change. On this basis, the highest energy per unit volume is obtained when the ratio of ballast weight to flywheel material weight is the greatest. For many flywheel applications, the slight degradation in energy/weight performance is of no consequence, compared to the large gain in energy/volume performance. More important than the increase achieved in energy per unit volume, for most applications, is the fact that the ballasted flywheel can be many times less expensive than the non-ballasted one, due to the relatively inexpensive nature of typical ballast materials when compared to the typical filamentary materials. Although the ballast material 34 should have a thickness varying inversely as the square of the radius, a practical situation would decrease the amount of ballast with increasing radius.

Figure 4:
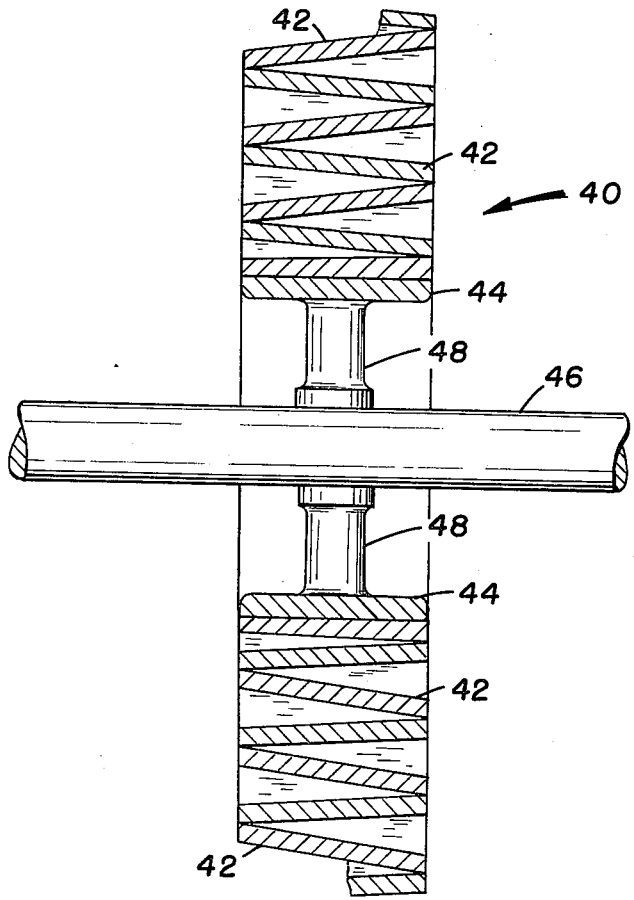
FIG. 4 is an elevation in section of a rotor according to the invention and being connected to the shaft by a hub/spoke connection.

In FIG. 4, another embodiment of the invention is shown to comprise a rim member 40 comprised of rings 42 formed of filamentary material in the same manner as are the rings 12 of FIGS. 1a and 1b. However, in this embodiment, the rings 42 are held on a hub 44 which is attached to a central shaft 46 by means of spokes 48. Thus, the filamentary portion of the structure is disposed about the periphery thereof to form essentially a "rim" type flywheel.

Obviously, the structures shown are only representative of the variety of structural modes in which the present invention can be embodied, the scope of the invention being defined by the following claims.

What is claimed is:

1. An inertial energy storage device for rotation about a shaft, comprising:
   rim means carried on the shaft and comprised of a plurality of substantially concentric ring elements formed of essentially anisotropic material having substantial tensile strength along longitudinal axes thereof; and,
   means for holding alternate adjacent edges of the concentric ring elements together.

2. The inertial energy storage device of claim 1 and further comprising spoke means extending from and joined to the shaft and annular hub means connected to the spoke means for carrying the rim means.

3. The inertial energy storage rotor device of claim 1 wherein said ring elements are formed of fiber composite material.

4. The inertial energy storage rotor device of claim 3 wherein said ring elements comprise filament windings.

5. The inertial energy storage rotor device of claim 3 wherein said ring elements are discrete rings.

6. The inertial energy storage rotor device of claim 1 wherein the ring elements have ballast material disposed therebetween.

7. The inertial energy storage rotor device of claim 6 wherein ring elements disposed relatively more near to the shaft have greater amounts of ballast material disposed therebetween than do those ring elements located within the structure at a relatively greater radial distance from the shaft.

8. The inertial energy storage device of claim 1 wherein the means for holding the alternate adjacent edges of the concentric ring elements together comprise adhesive material.

9. The inertial energy storage device of claim 8 wherein the holding means further comprise annular bands adhering to the edges.

10. The inertial energy storage device of claim 9 wherein the annular bands are comprised of windings of filamentary material.

* * * * *